Aug. 7, 1962 J. L. QUINN 3,048,181
CONTROL FOR COIN DISPENSING APPARATUS
Filed Oct. 30, 1959 9 Sheets-Sheet 1
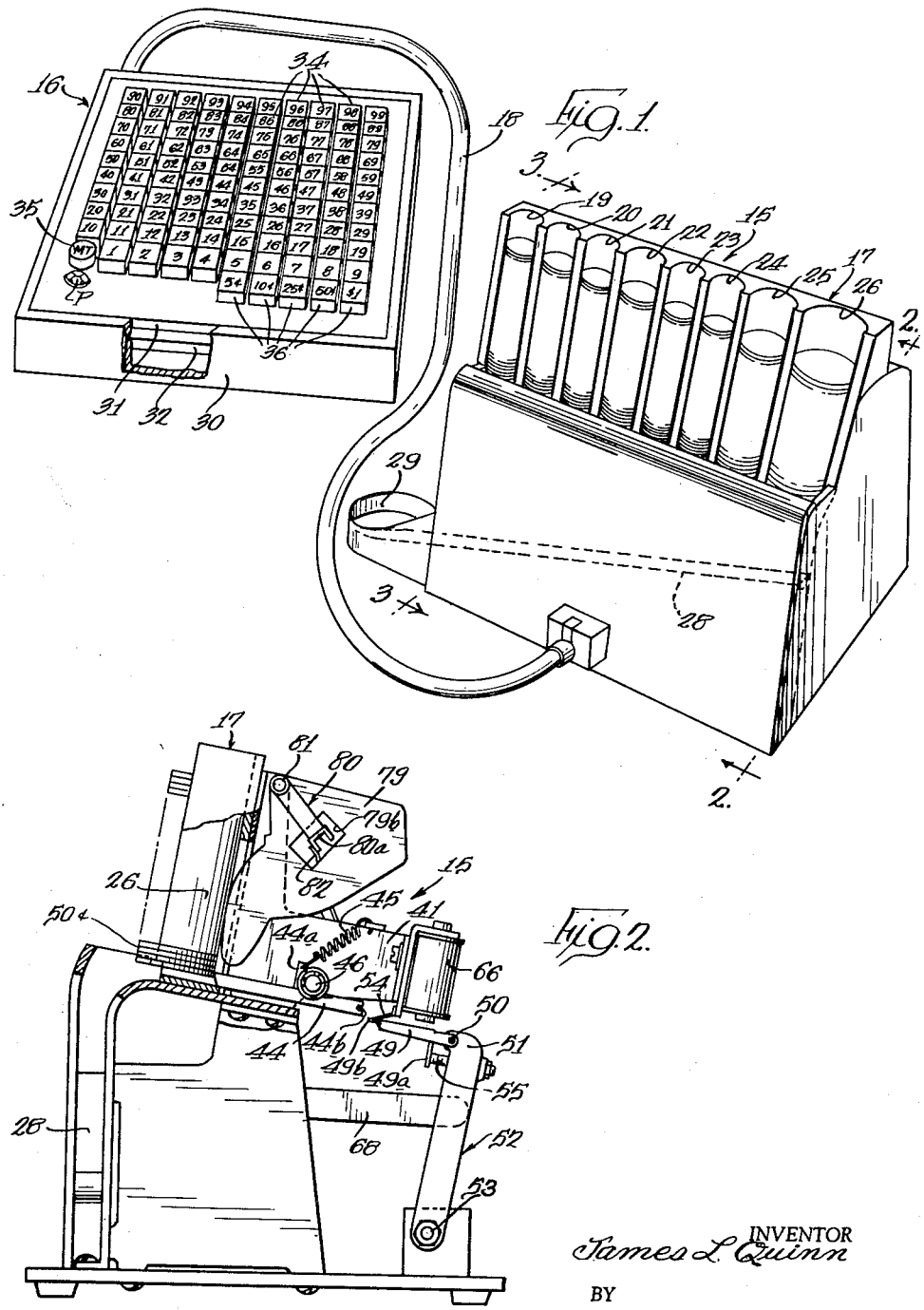
INVENTOR
James L. Quinn
BY
Wolfe, Hubbard, Voit & Osann
Attys.

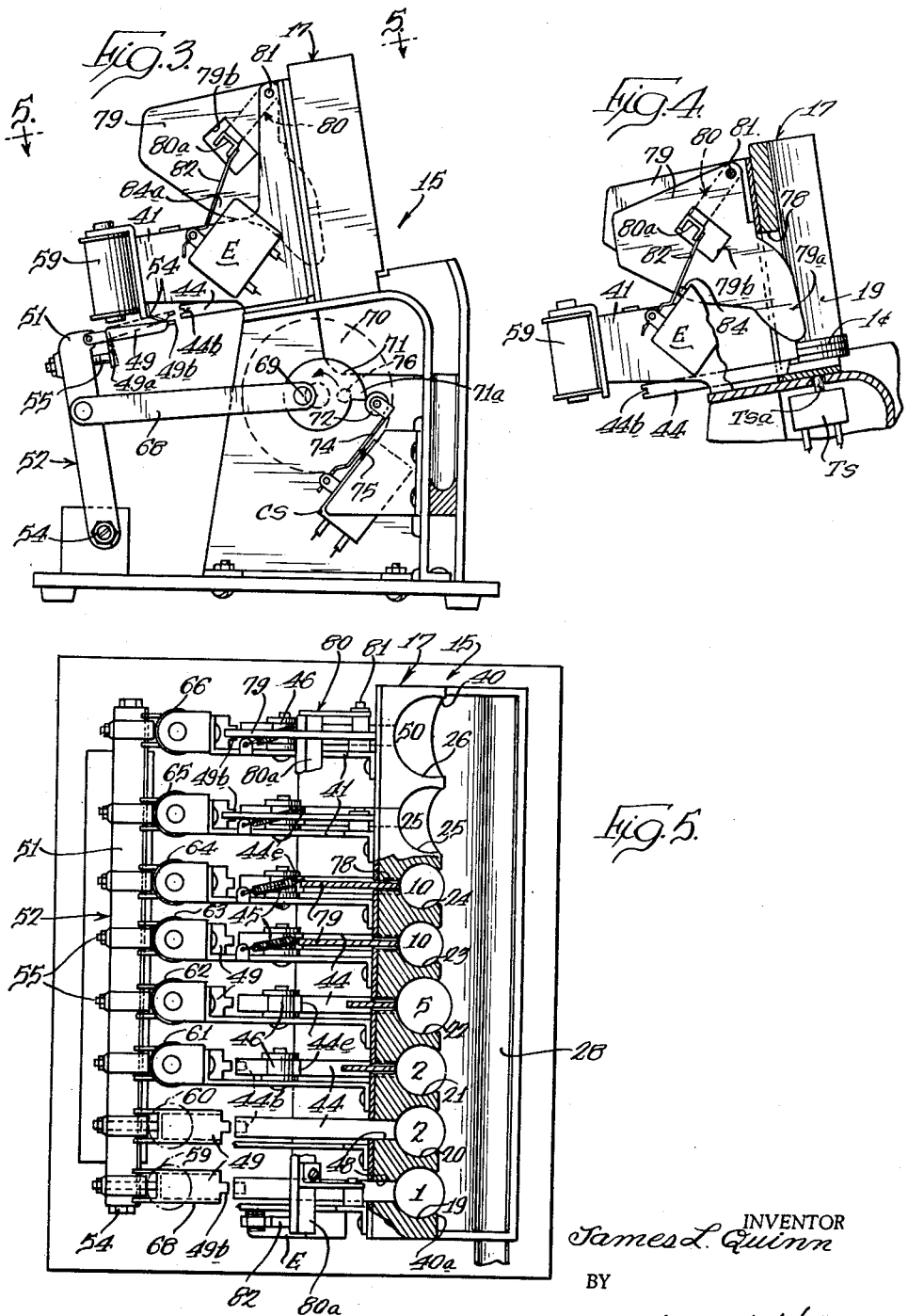

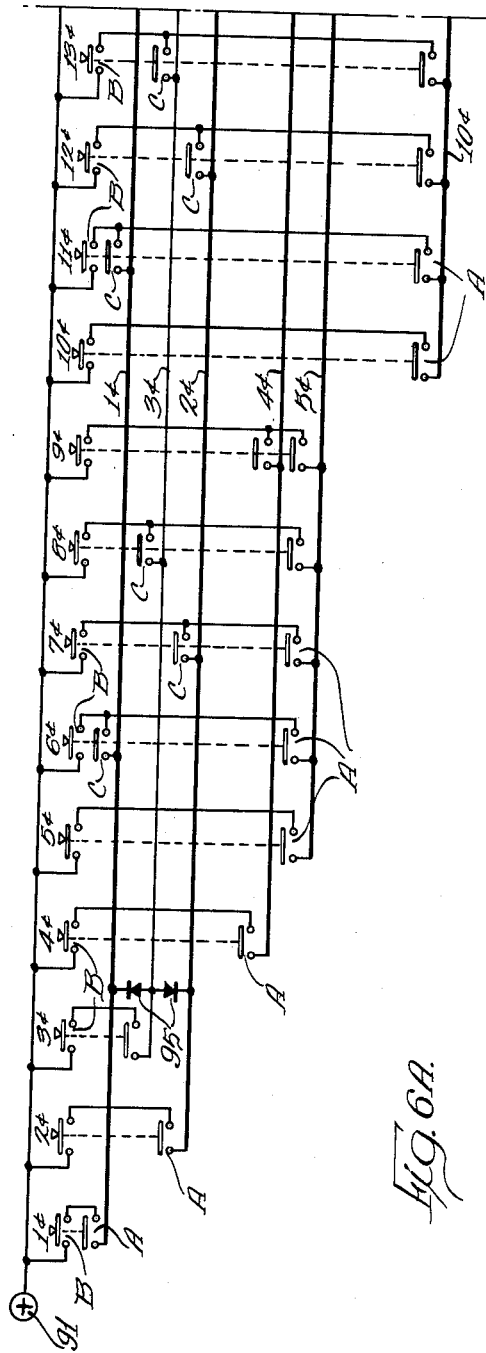

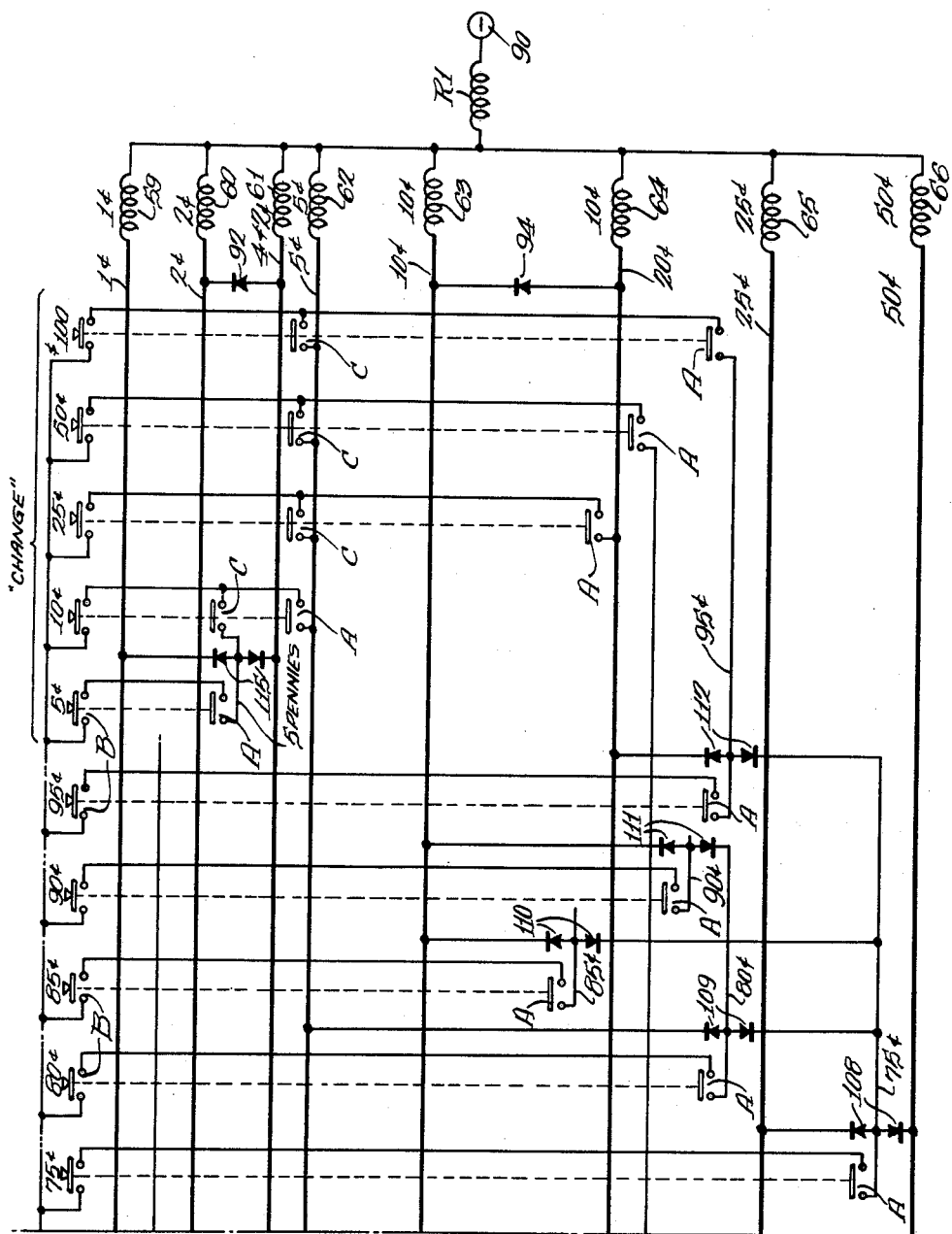

Aug. 7, 1962 J. L. QUINN 3,048,181
CONTROL FOR COIN DISPENSING APPARATUS
Filed Oct. 30, 1959 9 Sheets-Sheet 6
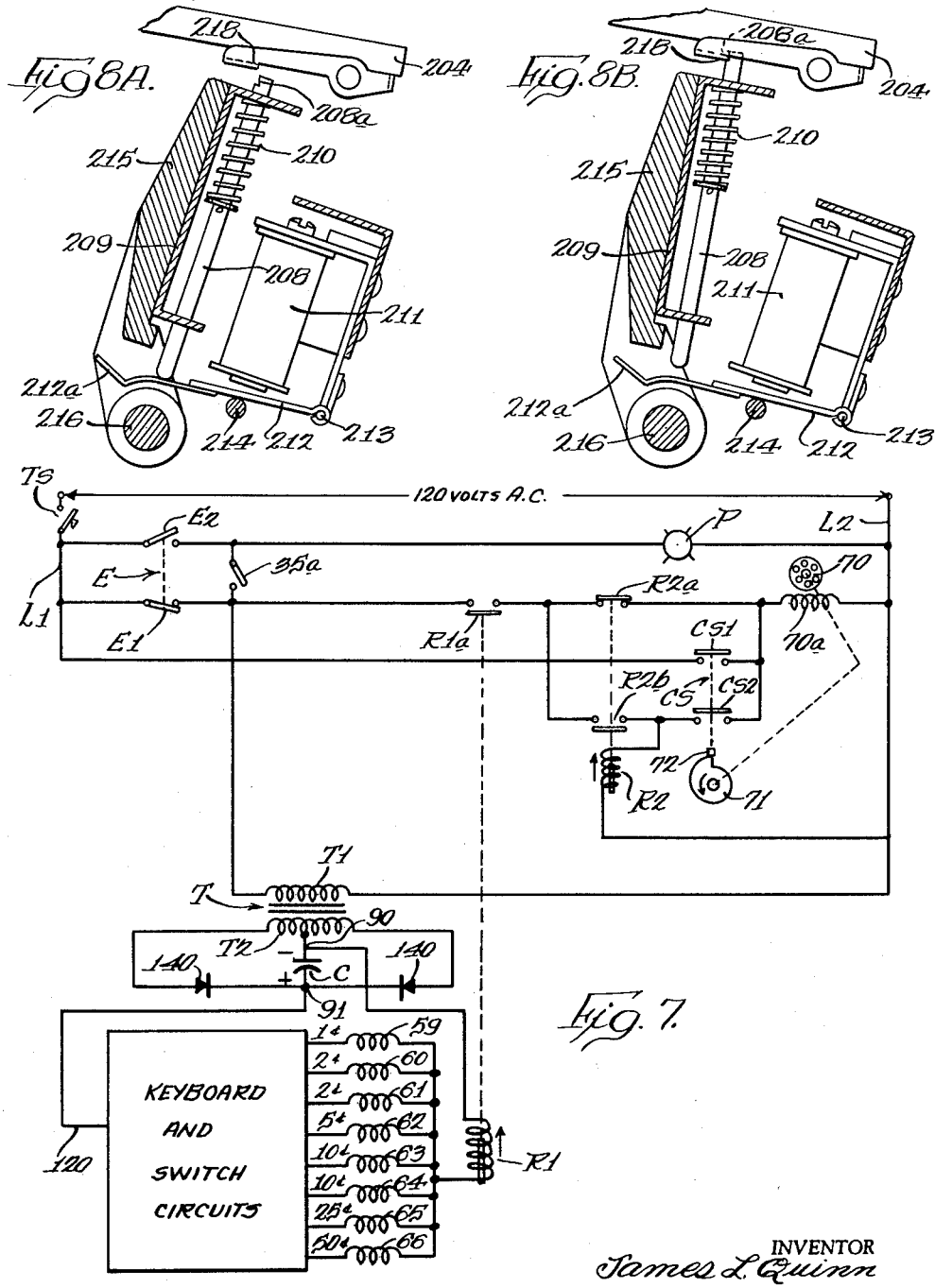

Aug. 7, 1962    J. L. QUINN    3,048,181
CONTROL FOR COIN DISPENSING APPARATUS
Filed Oct. 30, 1959    9 Sheets-Sheet 7

INVENTOR.
James L. Quinn
BY
Wolfe, Hubbard, Voit & Osann
Attys.

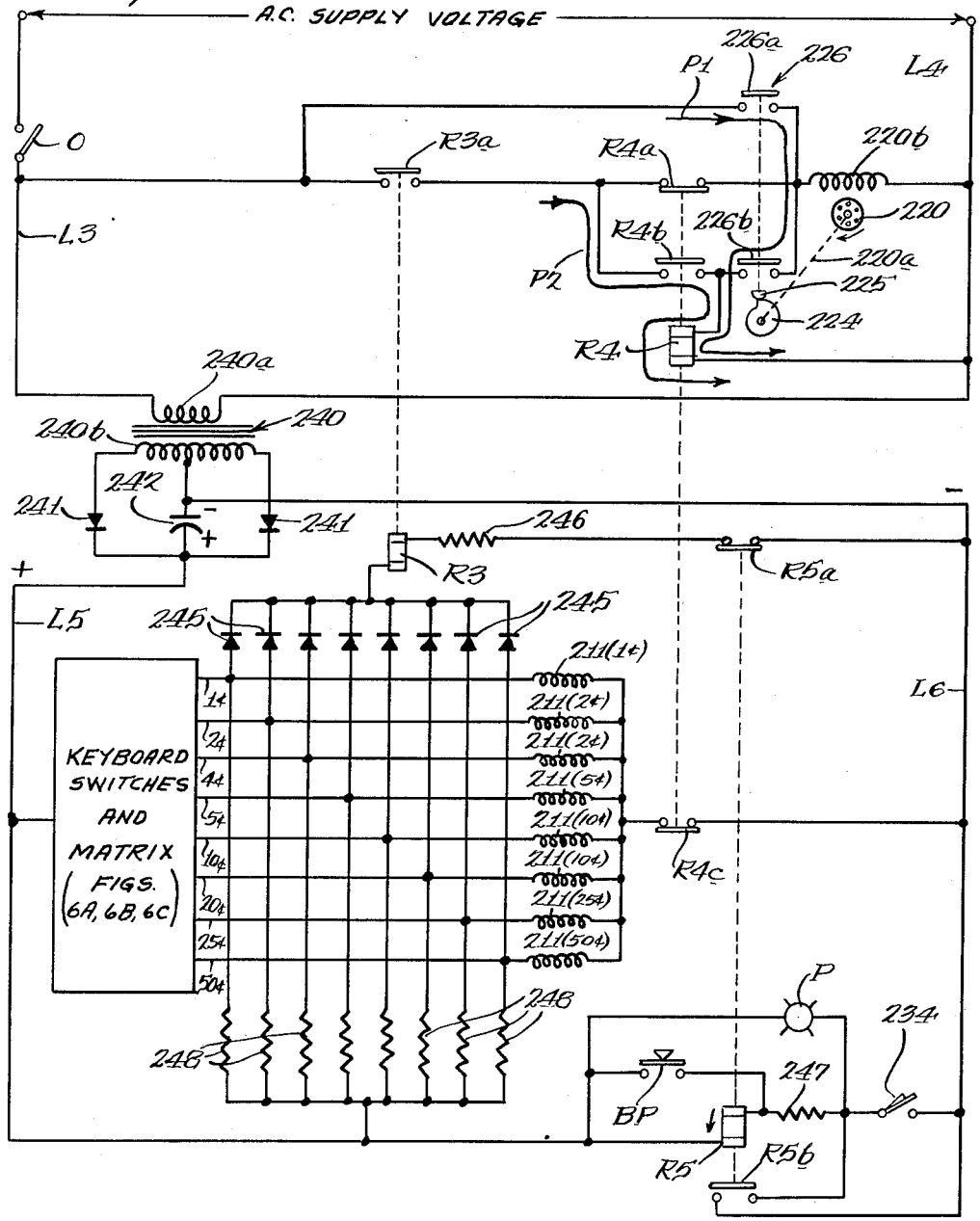

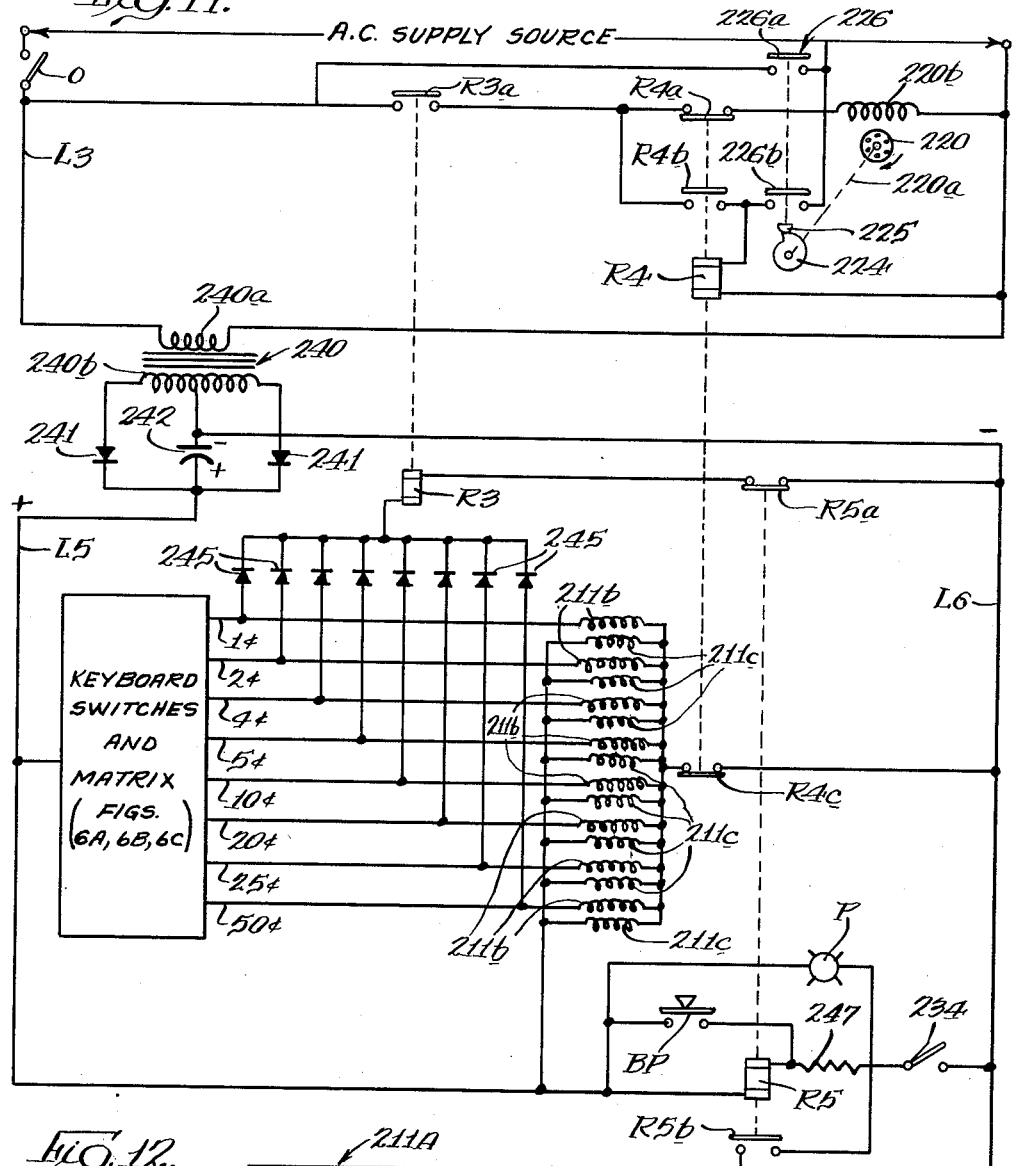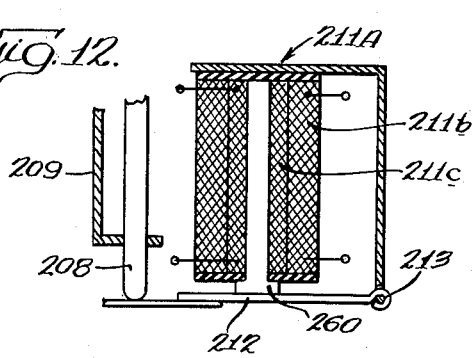

United States Patent Office 3,048,181
Patented Aug. 7, 1962

3,048,181
CONTROL FOR COIN DISPENSING APPARATUS
James L. Quinn, Chicago, Ill., assignor to Cummins-Chicago Corp., Chicago, Ill., a corporation of Illinois
Filed Oct. 30, 1959, Ser. No. 849,881
14 Claims. (Cl. 133—2)

The present invention relates in general to coin dispensing apparatus of the type which ejects from coin-holding magazines one or more coins totaling any one of several possible values of change. More particularly, the invention is concerned with electrically controlled coin changing apparatus, and has as its general aim the creation of a more simplified, compact, inexpensive and reliable form of such apparatus.

An important object of the invention is to provide an arrangement in which one cycle of operation of power means for effecting the ejection of coins is initiated in response to the energization of any one electrical actuator or selector device, yet in which all of the electrical actuators for a desired combination of coins are energized simultaneously, precluding false starts of the power means before all of the actuators for a desired combination are energized.

Another object of the invention is to provide an improved control system in which closure of any one of a plurality of selector switches both selects the combination of coins to be ejected and initiates the ejecting action, but in which a second ejection action cannot occur if the selector switch should be held closed.

It is a further object of the invention to make very short the time periods in which current flows through the selector switches and unidirectionally conductive devices associated with the keyboard, even though a selector switch is held closed for a prolonged time. This provision makes it possible to provide greater energizing current to the selector solenoids for a given current rating of the unidirectionally conductive devices or diodes. Stated another way, it is an object of the invention to reduce the possibility of overloading selector matrix components associated with a coin changer keyboard, and which may have limited current ratings.

A related object is to eliminate the possibility that selector members, which are magnetically shifted by energization of corresponding selector solenoids, might remain shifted due to residual magnetism, and might thereby cause improper operation on succeeding coin ejection cycles. In this sense, it is an object of the invention to eliminate the possibility of armatures associated with selector solenoids from being held in actuated positions due to residual magnetism by assuring that the duration of successive energizations of the solenoids is made quite short despite any action of the keyboard operator.

It is also an object of the invention to reduce the force required to shift selector members from first to second positions in response to operation of a selector key or switch, thereby minimizing the possibility that all of the desired selector members might not be shifted promptly in response to very short, momentary actuation of a given selector switch or key. In the parlance of the mechanics, this is to make the coin dispensing operation reliable even though a key is only "tickled."

It is a related object to "lock up" armature members moved in response to actuation of respective solenoids by closure of a key switch, so that the switch may be released almost immediately without causing failure of ejection from the corresponding coin magazine.

It is another related object to apply a biasing and a holding force to movable selectors before they are picked up in response to selective energization of associated solenoids, thus reducing the current required for such selective energization and eliminating the need to maintain such selective energization more than a fraction of a second in order to hold the selector members picked up.

Still another object is to provide for the removal of such biasing forces so as to permit return of the shifted selector members to their original positions after they have performed their functions during a given cycle of operation.

Other objects and advantages will become apparent as the following description proceeds, taken in conjunction with the accompanying drawings, in which:

FIG. 1 is a perspective view of coin dispensing apparatus embodying the features of the invention;

FIGS. 2 and 3 are side views, taken partially in section substantially along the lines 2—2 and 3—3, respectively, in FIG. 1;

FIG. 4 is a fragmentary detail view of means for detecting when a coin-holding magazine is substantially empty;

FIG. 5 is a plan view looking along the line 5—5 in FIG. 3, but progressively broken away and sectioned for illustration of details;

Figure 6B:
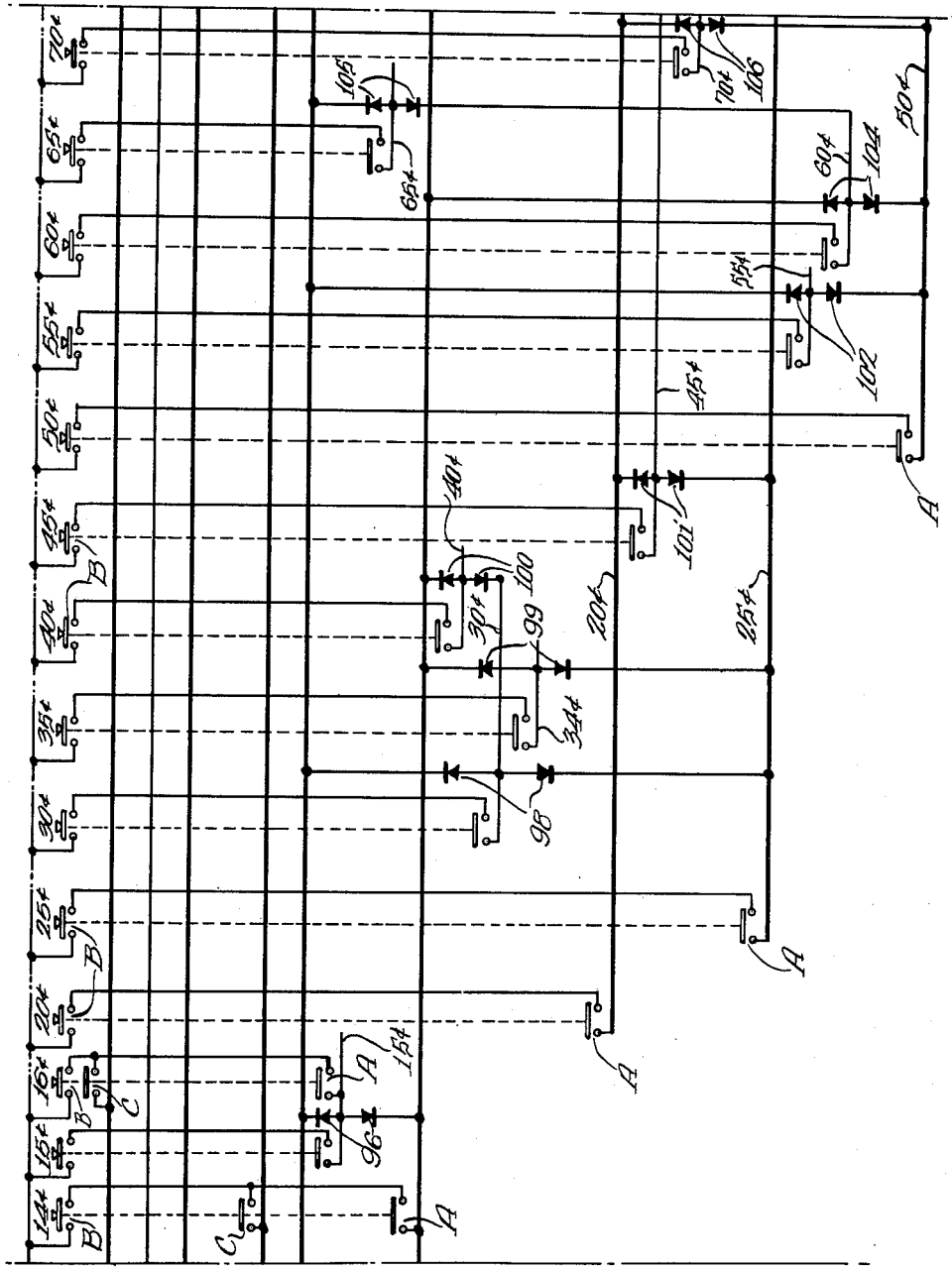
Figures 8, 9:
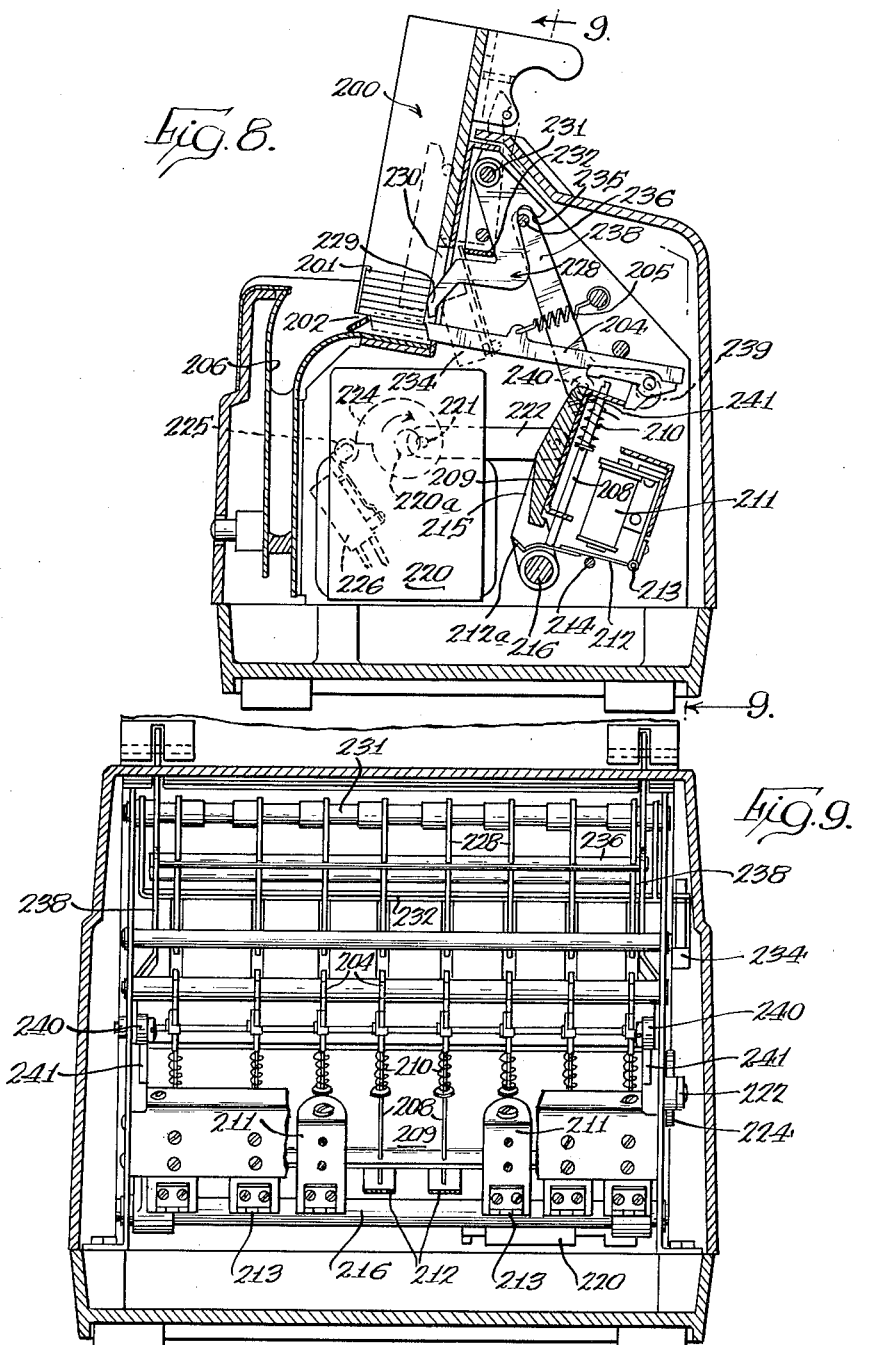

FIGS. 6A, 6B and 6C when connected along the indicated junction lines form a schematic diagram of the keyboard selector switches and circuitry, some of the switches and wiring connections being omitted for clarity;

FIG. 7 is a schematic diagram of the control circuits for the power-operated ejecting means;

FIG. 8 is a vertical transverse section of a modified form of coin changer mechanism;

FIG. 8A is an enlarged detail view showing the relationship between a selector or ejector member and a coin-ejecting slide in the mechanism of FIG. 8;

FIG. 8B is similar to FIG. 8A but illustrates the component parts in their relative positions shortly after the start of the ejection cycle;

FIG. 9 is a vertical section taken substantially along the line 9—9 in FIG. 8;

FIG. 10 is a schematic wiring diagram, generally similar to FIG. 7, of an alternative and preferred control system;

FIG. 11 is in general similar to FIG. 10, but illustrates a modified arrangement for applying holding forces to selector members; and FIG. 12 is a detail view of a double-coil solenoid for shifting and holding movable selector members.

While the invention has been shown and will be described in some detail with reference to particular embodiments thereof, there is no intention that it thus be limited to such detail. On the contrary, it is intended here to cover all modifications, alternative constructions and equivalents falling within the spirit and scope of the invention as defined by the appended claims.

Referring now to the drawings, a coin dispensing apparatus constituting a preferred embodiment of the invention has been illustrated in FIG. 1, in this instance comprising a coin magazine assembly 15 and a keyboard 16, the latter being remotely located from and connected to the former by a multiple conductor cable 18. In general terms, the assembly 15 includes a removable coin tray 17 formed with a plurality of magazines 19–26 adapted to hold coins of various denominations. In this instance, the first three magazines 19–21 are dimensioned to receive stacks of pennies, the fourth magazine 22 is shaped to receive a stack of nickels, the fifth and sixth magazines 23, 24 are adapted to hold stacks of dimes, while the seventh and eighth magazines 25 and 26 are sized to receive stacks of quarters and half-dollars, respectively. The magazine assembly 15, in a manner to be described in more detail below, is adapted to eject from the respective magazines 19–26 coins valuing 1¢, 2¢, 2¢, 5¢, 10¢, 10¢, 25¢, and 50¢, respectively. The ejected coins fall into an inclined coin chute 28 and roll downwardly to a receiving cup 29.

The keyboard 16 is made up of a frame 30 mounting vertically spaced top and bottom panels 31 and 32, the former being apertured to receive a plurality of pushbuttons 34 forming a part of selector switches. As here shown, there are ninety-nine such switch pushbuttons arranged in a 10 x 10 rectangular array, the place in the first row and first column of the array being vacant, but here shown as occupied by an auxiliary switch pushbutton 35 for a purpose to be described below. As labeled in FIG. 1, each of the switch pushbuttons 34 is assigned a different change value between 1¢ and 99¢, inclusive, there being ten columns which contain switches assigned to change values having units of 0–9, respectively, and ten rows assigned to change value having 0.9 multiples of ten, respectively. As will be more fully explained, the momentary depression of any of the switch buttons 34 causes the corresponding total value of change to be ejected from the magazines 19–26 and deposited in the cup 29. Such change values will be made up by coins constituting the "best change," i.e., the least possible number of coins for the total value desired.

Besides the ninety-nine switch buttons 34 disposed in the rectangular array, there are five extra switch buttons 36 labeled 5¢, 10¢, 25¢, 50¢ and $1.00. These are "change" switches rather than "payer" switches. That is, actuation of one of these auxiliary switches will result in the ejection, not of "best change," but of a plurality of coins totaling the value indicated. For example, in response to actuation of the 5¢ button 36, five pennies will be ejected instead of a nickel, and in response to actuation of the 50¢ button 36, one quarter, two dimes and a nickel will be ejected rather than one half-dollar.

While the present invention is illustrated in connection with a "coin payer" which produces change totaling the amount labeled on the respective switch buttons 34, it will be understood that the invention may be applied with equal advantage in a coin "changer," i.e., a device which ejects coins totaling the difference between $1.00 and the amount assigned to the respetcive pushbuttons. In short, the present invention may be employed with advantage in coin dispensing apparatus in general, regardless of the specific character of that apparatus.

Turning now in more detail to the magazine assembly 15, the coin tray 17 in which the magazines 19–26 are formed is removable from the rest of the assembly. It may be locked in place by any suitable means (not shown). As shown in FIG. 4, when the tray 17 is in place, it depresses the actuator pin TSa of a tray switch TS. The latter switch, in a manner explained below, disables all of the eleceric controls unless the coin tray is in place and the pin TSa is depressed. The coin magazines 19–26 are each formed in the tray 17 with a vertical slot or opening 40 (FIG. 5) in their front walls, which will not let coins pass laterally therethrough. At the very bottom of each magazine, however, the slot 40 is widened, as at 40a (FIG. 5) so that one or two coins may be pushed forwardly from the magazine into the chute 28. In the present instance, the widened slot portion 40a at the bottom of the magazines 20 and 21 is sufficiently high so that two pennies may be ejected simultaneously from these two magazines. In all of the other magazines 19 and 22—26, the widened portion 40a of the slot 40 is sufficiently high to permit only one coin at a time to be pushed forwardly into the chute 28. Thus, the magazines themselves may be labeled as shown in FIG. 5, as constructed to individually contribute for each ejection cycle thereof coins valuing 1¢, 2¢, 2¢, 5¢, 10¢, 10¢, 25¢, and 50¢, respectively.

Extending rearwardly behind each of the magazines 19–26 is a bracket 41 (FIGS. 3 and 5) which supports a slide 44. Such slides are biased rearwardly and upwardly by tension springs 45, and have projecting tabs 44a which are thus brought into engagement with stops or abutments 46 mounted on the respective brackets 41. Each of the slides 44 is disposed with its forward end in a slot opening into the lower portion of the corresponding coin magazine. As each slide 44 is moved forwardly, it engages the bottom coin in the magazine (the two bottom coins in magazines 20 and 21) and pushes it forwardly into the chute 28.

For selectively shifting the slides 44, a plurality of selector members are made movable from first positions to second positions in response to energization of corresponding electrical selector elements. As here shown, the selector members take the form of fingers 49 pivotally connected as at 50 to the crosspiece 51 of an inverted U-shaped member 52 which is pivoted at its opposite ends 53 to rock forwardly and rearwardly. The fingers 49 are movable between operative or effective positions, and inoperative or ineffective positions, by virtue of their pivotal connections to the crosspiece 51. They are normally biased downwardly (solid line position, FIG. 3) to their ineffective positions by individual leaf springs 54, so that downward projecting tabs 49a on such fingers abut adjustable stop screws 55 carried by the crosspiece 51. In such ineffective positions, the fingers 49 will pass beneath the associated slides 44 when the U-shaped members 52 is rocked forwardly, thus effectively disabling the associated ejector mechanism, i.e., leaving the slides 44 unmoved so that coins are not ejected from the corresponding magazines.

Electrical selector elements or actuators are provided for selectively raising the selector fingers 49 to their effective positions (dashed lines, FIG. 3) and causing them to abut and push the associated slides 44 forwardly, thereby ejecting a coin or coins from the corresponding magazines. As here illustrated, such actuators take the form of electromagnetic selector solenoids 59–66 supported by the respective brackets 41 and disposed immediately above respective ones of the ejector fingers 49. Energization of each solenoid 59–66 causes magnetic attraction of the associated finger 49, so that the latter is raised against the bias of its leaf spring 54 to a position in which its forward end is disposed opposite the rear end of the corresponding slide 44. If the U-shaped member 52 is then rocked forwardly, the raised finger 49 will engage and shift the associated slide 44 forwardly, causing the latter to eject a coin or coins from the associated magazine. It will be noted that the rear ends of the slides 44 are slotted as at 44b (FIG. 3) while the fingers 49 each are formed with a narrow key portion 49b adapted to enter the slot 44b. Thus, once a selector finger 49 has been raised and advanced sufficiently by movement of the U-shaped member 52 so that the key 49b enters the slot 44b, the finger and slide will remain in engagement until the U-shaped member is returned to its original position. Through this arrangement, each of the solenoids need remain energized only for a period of time sufficient for the finger key 49b to enter the slide slot 44b, after which the solenoid may be de-energized for the remainder of the ejection cycle.

For powering the rocking of the U-shaped member 52, it is connected by a pitman 68 to an eccentric 69 on the output shaft of a gear motor 70. As the eccentric 69 rotates through one revolution, the U-shaped member 52 will rock forwardly and rearwardly, causing those particular ones of the ejector fingers 49 which have been moved to operative positions to engage and shift the corresponding slides 44 forwardly, thus causing simultaneous ejection of coins from those particular magazines which correspond to the raised fingers 49.

The gear motor 70 is energized or its operation initiated in a manner which will be explained below. Once energized, however, the motor 70 continues to rotate until its output shaft has made one complete revolution. For this purpose, a spiral cam 71 is mounted on the output shaft of the gear motor 70 and formed with a portion 71a of relatively great radius. A cam follower 72 carried by a spring arm 74 engages the surface of cam 71 and is normally deflected downwardly by the cam portion 71a. When the motor 70 begins rotation, the cam follower 72 moves radially inward, thus releasing the actuator pin 75 of a cam switch CS. When the motor output shaft has made one complete revolution, the cam portion 71a again deflects the spring arm 74 downwardly, pressing the actuator 75 inwardly, and, by means to be described, terminating the energization of the motor. To make certain that the pitman 68 and the member 52 always stop in the same position when the cam switch CS de-energizes the motor 70, a spring biased ball detent 76 is preferably carried by the cam 71 or a part that rotates therewith. When the motor shaft has reached "home" position, the ball detent snaps into a recess formed in an adjacent stationary part (not visible in the drawings) to shift the shaft to a predetermined stopped position. In this manner, the gear motor 70 is caused to advance and retract the U-shaped member 52 one time for each ejection cycle.

Since the magazine assembly 15 may be remotely located from the keyboard 16, it is desirable to disable the apparatus and warn the operator if any of the coin magazines is almost empty. Otherwise, an incorrect amount of change might be ejected. For this purpose, the rear walls of the magazines 19–26 are formed with vertical slots 78 through which pass the depending ears 79a of "empty" detector plates 79. These plates 79 are pivoted to the brackets 41 behind and above each of the corresponding magazines, and are so shaped as to be overbalanced. Their depending ears 79a are thus biased by gravity toward the interior of the corresponding magazines. If coins within any given magazine should be reduced to a predetermined small number, the ears 79a of the corresponding plate will be released and permitted to swing toward the interior of the magazine. As stacks of coins are inserted into the magazines, however, they will engage and shift the ears 79a rearwardly.

To indicate when any magazine is about empty, i.e., when any of the plates 79 swings forwardly, all of such plates are formed with alined apertures 79b. Inserted through all of these apertures is a crosspiece 80a of a U-shaped lever 80 pivoted as at 81 to the end brackets 41 and bearing at one end against a leaf spring 82 which engages the actuator pin 84 of an empty switch E mounted on one end bracket. If any one of the plates 79 swings forwardly, the rear edge of its aperture 79b will engage the crosspiece 80a (FIG. 4), pushing the latter downwardly so that the leaf spring 82 depresses the actuator 84 to the "empty" detection switch E. The purpose and consequences of such switch actuation will be more fully explained below.

The switch means and circuitry for energizing the selector solenoids 59–66 and positioning the ejector fingers 49 in any combination to obtain ejection of any change value between 1¢ and 99¢ are schematically illustrated in FIGS. 6A, 6B and 6C. This advantageous organization is claimed in the copending application of James L. Quinn and James K. Duncan, Serial No. 659,670, filed May 16, 1957, now Patent No. 2,910,991, and of which the present application is a continuation-in-part. As there shown, the eight selector solenoids 59–66, which as previously explained will upon energization cause ejection of coins valuing 1¢, 2¢, 2¢, 5¢, 10¢, 10¢, 25¢ and 50¢, respectively, are all connected through the coil of a relay R1 (for a purpose to be explained) to the negative terminal 90 of a D.C. voltage source. A plurality of circuit connections lead through the ninety-nine pushbutton switches (only certain ones of which are shown in FIGS. 6A, 6B and 6C) to a positive terminal 91 of the voltage source.

Eight primary conductors assigned to primary change values of 1¢, 2¢, 4¢, 5¢, 10¢, 20¢, 25¢ and 50¢, respectively, as shown in FIGS. 6A, 6B and 6C, lead from the solenoids 59–66. That is, connections are established such that when these respective primary conductors are energized, and the ejecting mechanism put through one cycle of operation, the corresponding primary change values will be ejected. By the term "energized," as used in this specification, and in the claims, it is meant that connections are established to a conductor which permit current flow therethrough, and through those particular solenoids 59–66 which are associated with that conductor. It will be seen that because none of the magazines and their associated ejectors are constructed to eject primary change values of 4¢ and 20¢, some special provision is made in order to obtain those primary change values in response to energization of the corresponding primary conductor.

To cause ejection of the primary change value of 4¢ in response to energization of the 4¢ primary conductor, the solenoid 61 is connected directly to the 4¢ primary conductor, and the solenoid 60 connected to the 4¢ primary conductor through a unidirectionally conductive device or diode 92 (FIG. 6C). The diode 92 is poled such that if the 4¢ primary conductor is energized, both the solenoids 60 and 61 will attract or raise their associated ejector fingers 49 so that upon operation of the gear motor, two pennies will be ejected from each of the magazines 20 and 21 to produce a total of 4¢ in change. On the other hand, if the 2¢ primary conductor is energized, the solenoid 60 alone will raise its associated ejector fingers 49, because the diode 92 prevents current flow through the solenoid 61. It will be understood that the diode 92 could be eliminated if the magazine 21 were constructed to eject four pennies during each cycle of ejector operation instead of two pennies, as previously described. However, by the present arrangement, it is possible to make all of the parts and dimensions for the magazines 20 and 21 identical. Also, reliability of operation is increased since there is less possible variation in the height of a stack of two pennies as compared with a stack of four pennies, owing to wear of individual coins.

In like manner, the ejection of a primary change value of 20¢ in response to energization of the 20¢ primary conductor is achieved by connecting that conductor directly to the solenoid 64 and through a diode 94 to the solenoid 63. Thus the diode 94 is poled such that upon energization of the 20¢ primary conductor, current will flow through both the solenoids 63 and 64, so that upon operation of the ejection mechanism, one dime will be ejected from each of the magazines 23 and 24. It will be observed, however, that upon energization of the 10¢ primary conductor, the solenoid 63 alone will be energized so that a primary change value of 10¢ or one dime will be ejected. Again, it would be possible to eliminate the diode 94 by so constructing the second dime magazine 24 in a manner that one ejection cycle would push two dimes therefrom. However, by the arrangement described employing the diode 94, the parts and dimensions for the two magazines 63, 64 may be made identical, and reliability is enhanced.

The keyboard switches and circuitry include means for selectively energizing the eight primary conductors in order to obtain any one of the eight primary change values named above. For this purpose, the 1¢, 2¢, 4¢, 5¢, 10¢, 20¢, 25¢, and 50¢ selector switches as shown in FIGS. 6A, 6B, and 6C, each have normally open contacts connected in series between the corresponding primary conductors and the positive voltage source terminal 91. For example, if the 1¢ selector switch button 34 is pressed, current can flow from the positive terminal 91 through the 1¢B and 1¢A contacts in series to the 1¢ primary conductor, thence through the 1¢ solenoid 59 and the relay coil R1 to the negative terminal 90. Accordingly, the ejector finger 49 beneath the solenoid 59 will be moved to its operative position, and upon one revolution of the gear motor 70 the associated slide 44 will be shifted forwardly to eject one penny into the coin chute 28. A similar operation will occur if the other primary change value selector switches labeled 2¢, 4¢, 5¢, 10¢, 20¢, 25¢ and 50¢ are actuated. It will be observed, however, that when the 4¢ primary switch is closed, and current flows over the 4¢ primary conductor, both solenoids 60 and 61 will move their associated ejector fingers 49; and if the 20¢ primary selector switch is closed to energize the 20¢ primary conductor, both solenoids 63 and 64 will move their associated ejector fingers 49 to operative positions.

Each of the selector switches shown in FIGS. 6A, 6B, and 6C has at least two normally open contacts A and B. The construction of the switches is such that the A contacts close first, and remain closed or "wipe," and the B contacts close later in the progress of the pushbutton being depressed.

To obtain ejection of certain total change values which are made up of the sums of two primary change values, a third contact is added to the corresponding selector switches. As here shown, the 6¢, 7¢, 8¢, 9¢, 11¢, 12¢, 13¢, 14¢ and 16¢ switches all have a third normally open contact C. Taking the 6¢ switch by way of example, depression of its pushbutton will complete a circuit from the positive terminal 91 through the contacts B and A in series to the 5¢ primary conductor, and also complete a circuit through the contacts B and C in series to the 1¢ primary conductor. Accordingly, both the solenoids 59 and 62 will raise their associated ejector fingers 49, so that one revolution of the gear motor will result in ejection of one penny from the magazine 19 and one nickel from the magazine 22—making a total of 6¢ change. The same rationale applies with respect to the operation of the other switches named above. It will be seen, for example, that if the 12¢ selector switch is depressed, its contacts A and C will complete a circuit from the positive terminal 91 through its contacts B to energize the 10¢ and 2¢ primary conductors, so that change totaling 12¢ will be ejected from the magazines. This same system is employed for switches not shown in FIGS. 6A, 6B, and 6C assigned to change values of 21¢ (20¢+1¢), 22¢, 24¢, 26¢, 27¢, 29¢, 51¢, 52¢, and 54¢.

For the purpose of eliminating the necessity for more than three contacts on any of the selector switches, a plurality of secondary conductors are employed and means provided to cause ejection of any one of a plurality of secondary change values in response to energization of respective ones of those secondary conductors. In the present instance, as shown in FIGS. 6A, 6B, and 6C, fifteen such secondary conductors are provided and associated with means to cause energization of the solenoids 59–66 in such combinations that fifteen secondary change values can be selectively obtained. As labeled in FIGS. 6A, 6B, and 6C, these secondary conductors are interconnected between the eight primary conductors by unidirectionally conductive devices such that upon energization of the secondary conductors, secondary change values of 3¢, 15¢, 30¢, 35¢, 40¢, 45¢, 55¢, 60¢, 65¢, 70¢, 75¢, 80¢, 85¢, 90¢, and 95¢ will be ejected from the coin magazine. As shown in FIG. 6A, the 3¢ secondary conductor is connected by a pair of diodes 95 to the 1¢ and 2¢ primary conductors, the diodes being similarly poled with respect to the voltage source so that upon energization of the 3¢ secondary line by connecting it with the positive source terminal 91, current can flow through those diodes and over the 1¢ and 2¢ primary conductors to the solenoids 59 and 60. Thus, it will be seen that by pressing the 3¢ selector switch which has its normally open contacts A and B in series between the 3¢ secondary conductor and the positive source terminal 91, both the solenoids 59 and 60 will be energized to cause the ejection of 3¢ from the coin magazines. It will be observed, however, that while the 1¢ and 2¢ primary conductors may be simultaneously energized through the diodes 95 when the 3¢ secondary conductor is energized, the direct energization of the 1¢ or 2¢ primary conductors by themselves cannot result in the energization of the other one of the primary conductors because of the unidirectional conductivity of the diodes.

In like manner, it will be seen that the 15¢ secondary conductor is connected by a pair of similarly poled diodes 96 to both the 5¢ and 10¢ primary conductors. Energization of the secondary conductor 15 will therefore result in energization of both the solenoids 62 and 63 which are associated with the 5¢ and 10¢ coin magazines 22 and 23. The 30¢ secondary conductor is connected by a pair of diodes 98 to both the 5¢ and 25¢ primary conductors so that upon energization of the 30¢ secondary conductor, as by closure of the 30¢ selector switch, a secondary change value of 30¢ will be obtained from the coin magazines. The 35¢ secondary conductor is connected by a pair of diodes 99 to both the 10¢ and 25¢ primary conductors. To obtain a secondary change value of 40¢ upon energization of the 40¢ secondary conductor, the latter is connected by a pair of diodes 100 to the 10¢ primary conductor and the 30¢ secondary conductor. Therefore, upon energization of the 40¢ secondary line, the solenoid 63 will be energized (to cause ejection of a dime), and both the solenoids 62 and 65 will be energized (to cause ejection of a nickel and a quarter, respectively).

In a similar manner, the 45¢ secondary conductor is connected by a pair of similarly poled diodes 101 to both the 20¢ and 25¢ primary conductors; the 55¢ secondary conductor is connected by a pair of diodes 102 to both the 5¢ and 50¢ primary conductors; the 60¢ secondary conductor is connected by diodes 104 to the 10¢ and 50¢ primary conductors; the 65¢ secondary conductor is connected by a pair of similarly poled diodes 105 to the 60¢ secondary conductor and the 5¢ primary conductor; the 70¢ secondary conductor is connected by a pair of diodes 106 to the 50¢ and 20¢ primary conductors; the 75¢ secondary conductor is connected by a pair of diodes 108 to the 25¢ and 50¢ primary conductors; the 80¢ secondary conductor is connected by a pair of diodes 109 to both the 5¢ primary conductor and the 75¢ secondary conductor; the 85¢ secondary conductor is connected by a pair of diodes 110 to the 10¢ primary conductor and the 75¢ secondary conductor; the 90¢ secondary conductor is connected by a pair of diodes 111 to both the 10¢ primary conductor and the 80¢ secondary conductor; and the 95¢ secondary conductor is connected by a pair of diodes 112 to both the 20¢ primary conductor and the 75¢ secondary conductor.

From the foregoing, it will be readily understood how each of the above-mentioned secondary change values is obtained in response to energization of the corresponding secondary conductor. Merely by way of example, consider the circuits established upon closure of the 90¢ selector switch (FIG. 6C). Closure of the B and A contacts, which are in series, will connect the positive voltage source terminal 91 directly to the 90¢ secondary conductor. Accordingly, current can flow through the upper diode 111 to the solenoid 63 (which will cause ejection of one dime from the magazine 23) and can flow through the lower diode 111 to energize the 80¢ secondary conductor. From the latter conductor, current can flow through the upper diode 109 and over the 5¢ primary conductor to the solenoid 62 (which will cause ejection of a nickel from the magazine 22). Current may also flow from the 80¢ secondary conductor through the lower diode 109 to the 75¢ secondary conductor, and thence through the upper diode 108 to the 25¢ conductor and the solenoid 65 (which will cause ejection of a quarter from the magazine 25). Current also flows through the lower diode 108 to the 50¢ primary conductor and solenoid 66 (which will cause ejection of a half-dollar from the magazine 66). The total of these coins—one dime, one nickel, one quarter, and one half-dollar—constitutes the desired secondary change value.

The advantage of providing secondary conductors, and particularly secondary conductors assigned the values indicated above, will be made more clear as the following description proceeds. Consider for the moment, however, the 15¢ secondary conductor. It will be seen that it is related to the solenoids 62 and 63 which when energized respectively cause the ejection of one nickel and one dime. These two electrical actuators or solenoids may be individually energized by closure of the 5¢ and 10¢ selector switches respectively. But a third switch, i.e., the 15¢ selector switch, is connected through the 15¢ secondary conductor and the two diodes 96 to both the 5¢ and 10¢ primary conductors. As a result, and due to the polarization of the diodes 96 with respect to the D.C. voltage source represented by the terminals 90 and 91, closure of the 15¢ selector switch energizes both the 5¢ and 10¢ primary conductors and solenoids 62 and 63. But closure of either the 5¢ or the 10¢ selector switch alone will result in energization of the corresponding primary conductor and solenoid, but without energizing the other primary conductor and solenoid.

To obtain change values between 15¢ and 20¢ it is only necessary to make the 16¢, 17¢, 18¢ and 19¢ selector switches have two effective contacts, one of which can cause energization of the 15¢ secondary conductor, and the others of which energize those conductors to produce the additional change required, i.e., 1¢, 2¢, 3¢ or 4¢ in order to make up the total of 16¢, 17¢, 18¢ or 19¢. This is illustrated by way of example in FIG. 6B by the 16¢ selector switch. As there shown, the switch has three contacts A, B and C, the B contacts being for a special purpose to be described. The A contacts of the 16¢ switch when closed complete a conduction path from the positive terminal 91 through the B contacts to the 15¢ secondary conductor. The C contacts likewise complete a conduction path to the 1¢ primary conductor. Therefore, when the 16¢ selector switch is actuated, one penny, one nickel, and one dime totaling the desired 16¢ in change will be ejected from the coin magazines.

It will be apparent from the foregoing how all of the other selector switches between 1¢ and 99¢ which are not shown in FIGS. 6A, 6B and 6C may be connected in order to provide all of the various possible change values. For example, the 17¢ selector switch which is not shown would be identical with the 16¢ selector switch except that its C contacts would connect with the 2¢ primary conductor rather than the 1¢ primary conductor. In like manner, change values between, say 45¢, and 50¢ could be obtained by providing switches having A and C contacts to complete energization paths to both the 45¢ secondary conductor and the 1¢, 2¢, 3¢ and 4¢ conductors, respectively. This pattern of wiring, therefore, utilizing one switch for each of many possible values of change which may be obtained, a plurality of primary conductors, and a plurality of secondary conductors interconnected by diodes to the primary conductors results in a circuit organization which not only permits switches having a lesser number of contacts but also permits the use of a relatively simple wiring arrangement.

In order to understand that complete sequence of operation for one coin ejection cycle, reference may be had to the schematic diagram of the control circuit shown in FIG. 7. As there shown, the lines L1, L2 are connected to a suitable A.C. voltage source whenever the switch TS is closed. Since as described with reference to FIG. 4, the switch TS is actuated only when the coin tray 17 is in place, the entire control circuit is disabled whenever the operator removes the coin tray. The switch TS thus serves not only as an on-off switch but precludes curious meddling whenever the operator leaves his station and takes the coin tray with him, as is the common practice. The D.C. voltage source for the selector switch circuitry is created by connecting a primary winding T1 of a transformer T across the lines L1, L2 through normally closed contacts E1 of the empty detector switch E. The secondary winding T2 of the transformer T is center-tapped, its extremities being connected through similarly poled diodes or rectifiers 140 to the positive terminal 91, and a filtering condenser C connected from the latter terminal to the center tap of the secondary winding to form the negative terminal 90. Thus, as long as the empty detector contacts E1 are closed, the terminal 91 will be positive with respect to the terminal 90. The positive terminal 91 is connected, as indicated, by the conductor 120 to the keyboard and switch circuits. The latter circuits as shown by FIGS. 6A, 6B and 6C include the selector solenoids 59–66 which are all connected in series with the coil of relay R1 to the negative terminal 90.

Means are provided which in response to the closure of any one of the selector switches will energize the ejecting motor 70. For this purpose, the relay R1 has normally open contacts R1a connected in series with the field winding 70a of the motor 70 across lines L1, L2 through the contacts E1 and normally closed relay contacts R2a, controlled by a relay R2. Thus, as soon as any selector switch on the keyboard is closed and current flows through any one or any combination of the selector solenoids 59–66, the relay R1 will be energized and the contacts R1a closed. This will energize the field winding 70a of the motor 70 (which may be a shaded pole type induction motor). As soon as the motor shaft turns slightly, however, normally open contacts CS1 and CS2 of the cam switch CS will close, the contacts CS1 creating a seal-in circuit from the line L1 for the motor field winding 70a. The motor 70 will thus continue to rotate until its output shaft makes one complete revolution and the cam 71 again opens the contacts CS1, even though the selector switch should be released and the relay R1 de-energized. The cam 71 and the cam switch contacts CS1 thus form means for continuing the energization of the motor 70, but stopping the motor after its output shaft has made one complete revolution.

It is highly desirable to prevent the motor from being energized for rotation through a second revolution if the operator should inadvertently hold a selector switch closed until after the cam switch contacts CS1 re-open. For this purpose, an anti-repeat relay R2 is connected in the circuit with means to energize it as an incident to the motor 70 being started, and with means for continuing the energization of that relay for so long as a selector switch is closed, the relay having means to prevent re-energization of the motor through the relay contacts R1a after the cam switch contacts CS1 reclose. In more detail, it will be seen from FIG. 7 that the relay coil R2 is connected in series from the line L1 through the contacts E1, R1a, normally closed contacts R2a, and cam switch contacts CS2 to the opposite line L2. Therefore, as soon as the motor 70 is started and the cam switch contacts CS2 close, the relay R2 will be energized thus causing its normally closed contacts R2a to be opened. The relay R2 will be sealed in through the contacts CS1 and CS2 until the motor completes one revolution and if at the completion of such revolution and the resultant opening of the contacts CS1 and CS2, a selector switch is still held closed by the operator and the relay R1 is still actuated, then the relay R2 will be sealed in through the relay contacts R1a and its own normally open contacts R2b. For as long as the relay R2 is energized, the contacts R1a, even if closed, cannot energize the motor 70 to start it on another ejection cycle. Therefore, before a second ejection cycle can be initiated, the operator must release the keyboard switch thereby de-energizing the relay R1 and causing the contacts R1a to open. This will unseal or de-energize the relay R2, so that the contacts R2a will re-close and condition the circuit for a second cycle of operation.

It may also be observed from FIG. 7 that the contacts E1 of the empty detector switch E, when actuated, will completely disable the selector switches and the motor 70. Current cannot then pass either to the transformer primary winding T1 or to the motor field 70a. In this manner, whenever the supply of coins in any given magazine is substantially depleted, presenting the possibility of an erroneous amount of change being ejected, the circuitry is completely disabled. This situation may be brought to the attention of the operator by normally open contacts E2 for the empty detector switch E connected in series with a pilot light P across the lines L1, L2. Thus, whenever an empty magazine is detected and the circuitry disabled by the contacts E1, the pilot light P located at the keyboard (FIG. 1) will be energized to inform the operator of this condition. If it is desired to operate the ejecting mechanism one or more times even if coin magazines are substantially empty—and this might be desired in some instances to completely empty all of the magazines—a normally open, manually controlled by-pass switch 35a (controlled by the pushbutton 35, FIG. 1) may be connected in series with the normally open contacts E2 and thence in parallel with the normally closed contacts E1. Thus, to operate the ejecting mechanism even though a coin magazine is empty, the operator simply presses or closes the by-pass switch 35a. The pilot light P will remain energized, but the keyboard circuits and the motor circuitry will be operative in the same manner as described before.

It is to be particularly noted in connection with the controls illustrated by FIG. 7 that the operator need only depress any one of the selector switch pushbuttons in order to obtain the corresponding amount of change. He need not first select the amount by pushing a selector switch, and then actuate a second switch to initiate the operation of the ejecting means. Rather, by the provision of a current responsive relay in series with all of the selector solenoids 59–66, the power means for physically ejecting the selected combination of coins is started automatically as soon as one of the selector solenoids is energized.

Referring now to FIGS. 8, 8A, 8B and 9, the alternative coin dispensing mechanism there shown includes eight coin-holding magazines 200 adapted respectively to receive coins of the values indicated in FIG. 5. One such magazine 200 is illustrated in cross section by FIG. 8, and holds vertically stacked coins 201. At the bottom of the magazine 200 is an exit opening 202 which is disposed in front of a coin-ejecting slide 204. The slide 204 is biased rearwardly (to the right) by a tension spring 205 but, when moved forwardly, will push one or two of the coins 201 into a coin chute 206 which leads to a delivery cup (such as that shown in FIG. 1).

It will be understood that there are eight magazines substantially like that shown at 200 in FIG. 8, and that there are eight corresponding slides 204. To selectively translate these eight slides, each is associated with a selector member or finger. In FIGS. 8–9, the finger associated with the slide 204 is a pin 208 carried by a frame 209 and movable between first and second positions. More explicitly, the pin 208 slidably extends through holes in the upper and lower portions of the frame 209, and is normally biased downwardly to a first position by a compression spring 210. The selector member or pin 208 may be moved to its second or upper position in response to energization of an actuator or electric solenoid 211. As shown in FIG. 8, the solenoid 211 is mounted over an armature or arm 212 pivoted at 213 and normally resting in a lowered position against a stop bar 214. With the solenoid 211 deenergized, therefore, the arm 212 and the pin 208 are in their lower positions illustrated by FIGS. 8 and 8A. If, however, the selector solenoid 211 is energized, the arm 212 is raised, thereby lifting the pin 208 against the downward bias of the associated spring 210.

The pins 208 (each one associated with one of the eight coin magazines) are spaced along a carriage 215 which is of generally inverted U-shape and pivoted at its opposite, lower ends to a rod 216. If the carriage 215 rocks forwardly about the shaft 216 when a pin 208 is in its first or lowered position, the upper end of that pin will pass free of a latch member 218 carried by the rear portion of the associated slide 204. Thus, the slide will not be advanced. If, however, the solenoid 211 is energized to lift the pin 208 when the carriage 215 begins its forward (counterclockwise) motion, a latch tip 208a on the upper end of the pin 208 will engage with the latch member 218 and thus push the slide 204 forwardly. In this manner, coins are ejected from any combination of the magazines 200 by the slides 204 during ejection movements of the carriage 215 depending upon which ones of the eight selector solenoids 211 have been energized prior to carriage motion to raise the corresponding pins 208 for engagement with the associated latch members 218.

Once the latch tip 208a has become engaged with the latch member 218, the associated solenoid 211 may be deenergized since the two parts will remain in engagement until the slide 204 is returned to its limit position and that latch tip 208a withdrawn free of the latch member 218. Thus, the latching parts hold the pin 208 in driving engagement with the slide 204, but the spring 210 automatically returns the pin 208 to its lower position after the carriage 215 has been returned to its home position.

In order to drive the carriage 215 through rocking cycles of motion (and in a manner similar to the power drive of the carriage 52 shown in FIG. 2), a gear motor 220 has on its output shaft 220a an eccentric pin 221 which is connected by a pitman 222 to the carriage 215. The gear motor 220 is controlled so that its output shaft 220a executes one revolution for each ejection cycle, and so that rotation of the shaft 220a terminates with the carriage 215 in the position illustrated by FIG. 8. To assist in this control of the motor 220, a cam 224 is mounted on the output shaft 220a and engaged by a follower 225 which actuates a cam switch 226.

As noted previously in connection with FIGS. 2–5, it is desirable to disable the machine and signal the operator whenever any one of the several coin magazines becomes empty. In the arrangement shown in FIG. 8, the presence or absence of coins in the magazines 200 is sensed by feelers 228 having tips 229 which normally project through slots 230 in the rear walls of the respective magazines. The feelers 228 are pivoted on a cross bar 231 so that their tips 229 tend to swing into the associated magazines 200 under the influence of gravity. If a feeler tip 229 engages coins 201, however, this clockwise swinging movement of the feeler 228 is prevented. Only in the event that the coins are substantially depleted from a magazine 200 will the feeler 228 swing clockwise sufficiently to deflect a cross bar 232 and swing the latter about the pivot 231 so that it actuates an empty switch 234. The bar 232 extends across the entire coin dispensing machine and thus can be deflected by clockwise movement of any one of the feelers 228 associated with any of the eight coin magazines. The empty switch 234 will, therefore, be actuated whenever any one of the magazines is substantially depleted.

After coins have been ejected from a given one of the magazines 200, the remaining stack of coins must drop somewhat under the influence of gravity to seat the lowermost coin at the bottom of the magazine in position for ejection by the slide 204. If the feeler tip 229 is biased toward the interior of the magazine 200 during this period when the coins must fall freely, it may interfere with proper re-setting of the coins. To overcome this difficulty, provision is made in the mechanism of FIG. 8 to withdraw momentarily the feelers 228 from the magazines 200 during each ejection cycle. For this purpose, the feelers 228 are formed with notches 235 which receives a cross rod 236 extending between two bell cranks 238 disposed at opposite ends of the machine. The rod 236 has a lost-motion connection with the feelers 228 due to the excess width of the notches 235. As shown in FIG. 8, the bell cranks 238 are pivoted at 239 and carry near their midportions, rollers or cam followers 240. These cam followers 240 ride on camming surfaces 241 formed at the ends of the carriage 215. As the carriage moves forwardly during an ejection cycle, the cam surfaces 241 rock the bell cranks 238 clockwise (as viewed in FIG. 8) about the pivots 239 so that the rod 235 will momentarily rock all of the feelers 228 counterclockwise about the pivot 231, thereby withdrawing the feeler tips 229 from the coin magazines 200. When the carriage 215 returns to its original position, the rod 236 is returned to its home position so that the feelers 228 again move inwardly to engage and sense the presence of coins in the magazines. If any magazine is depleted, the associated feeler will rock clockwise sufficiently to displace the bar 232 which will actuate the "empty" switch 234.

To selectively energize the solenoids 211 of FIGS. 8–9, the keyboard 16 illustrated in FIG. 1, including the selector switches and diode connections of FIGS. 6A–6C, may be employed. As an alternative to the control system of FIG. 7, however, the preferred control system of FIG. 10 may be employed with the advantages to be pointed out below.

Referring to FIG. 10, the eight selector solenoids 211 are labeled with the respective change values ejected in response to energization thereof during an ejection cycle. The gear motor 220 of FIG. 8 is shown as a single phase, shaded pole induction motor having a field winding 220b. The output shaft 220a of the motor carries the cam 224 controlling the actuation of the switch 226 which has normally open contacts 226a and 226b. Voltage supply lines L3, L4 are connected to a suitable A.C. source whenever an on-off switch O is closed. This prepares the control circuit for the motor 220 and also energizes the primary winding 240a of a transformer 240 having a secondary winding 240b. Rectifiers 241 and a smoothing capacitor 242 connected to the secondary winding 240b thus place a D.C. supply voltage on the lines L5, L6, the former being positive with respect to the latter. This renders the keyboard switch circuit (represented in block form by FIG. 10 but shown in detail by FIGS. 6A, 6B, 6C) ready for operation.

It is believed that the advantageous organization and operation of the control circuit shown in FIG. 10 can best be described by a narrative of one complete cycle of operation. Closure of any one of the selector switches shown in FIGS. 6A–6C will result in a circuit being established from the line L5 to a particular combination of the eight output lines leading from the matrix. When any one or any combination of the output lines leading from the keyboard switch circuit are placed at the potential of the line L5, current flows through a corresponding combination of the eight solenoids 211, and through the normally closed relay contacts R4c. Thus, a particular combination of the solenoids are energized to raise the corresponding combination of the selector members or pins 208 in FIG. 8.

With the energization of any one or any combination of the solenoids 211, a relay R3 is also energized by current flow through one or more of a plurality of unidirectionally conductive diodes 245 and through a resistor 246 and normally closed relay contacts R5a. The diodes 245 makes it possible for the relay R3 to be energized whenever any one of the solenoids 211 is energized, and yet prevent the energization of one of the solenoids from causing energization of any of the others. The resistor 246 limits the current flow through the relay coil R3, the latter relay being of a relatively sensitive type. The resistor 246 may be formed by the resistance of the coil of the relay R3.

In response to closure of any keyboard switch, therefore, a certain combination of the solenoids 211 will be energized and the relay R3 will be simultaneously energized. Pick-up of the relay R3 results in closure of its contacts R3a, thereby completing an energization circuit from the line L3 through the normally closed relay contacts R4a to the motor field winding 220b. Accordingly, the motor 220 begins rotation and starts the reciprocatory movement of the carriage 215 (FIG. 8).

As soon as the motor begins rotation, the follower 225 (FIG. 8) is lowered by the cam 224 and the cam switch contacts 226a, 226b both close. Thus, a circuit is established through the contacts 226a to hold the motor field 220b energized even though the key switch should immediately be released to deenergize the relay R3 and re-open the contacts R3a. Moreover, as soon as the contacts 226b close, a conduction path p1 is established to energize the coil of a relay R4. Thus, the relay contacts R4c open shortly after the motor 220 begins rotation, thereby deenergizing the particular ones of the solenoids 211 which were previously energized if the operator should be holding the key switch closed. By the time the contacts R4c open to deenergize these solenoids, however, the carriage 215 has advanced from the position shown in FIG. 8A to the position shown in FIG. 8B so that those ones of the pins 208 which were previously raised by energization of their corresponding solenoids are mechanically latched up in engagement with their associated coin-ejecting slides.

As soon as the relay R4 is energized, its contacts R4a also open and its contacts R4b close. This prevents the motor 220 from executing more than one ejection cycle even though the selector key switch might be held closed for a prolonged period. Let it be assumed first that the selector key switch has been released so that the relay R3 is deenergized and the contact R3a is opened while the motor shaft 220a is executing one revolution. At the end of that revolution, the cam switch contacts 226a and 226b will both re-open, so that the motor field 220b is deenergized and the relay R4 also deenergized. With this, the circuit is restored to its original condition ready for another cycle of operation.

If, however, the operator should hold down the selector key, or depress a second selector key prior to completion of the ejection cycle, the relay R3 will be energized at the instant the cam switch contacts 226a and 226b re-open. Under these circumstances, the relay R4 will be held energized when the cam 224 opens contacts 226a and 226b by current flow through a path p2 which includes the contacts R3a and contacts R4b. Thus, so long as any selector key is maintained in an actuated condition and the relay R3 is accordingly picked up, the relay R4 will be energized and the contacts R4a will be open. It will not be possible to restart the motor 220 to cause a second cycle of coin ejection unless the key switch is first released to open the contacts R3a so that relay R4 drops out. In this manner, the relay R4 prevents inadvertent "repeats," that is, prevents double ejection of a selected coin value even though the operator might hold a key depressed for a long period of time.

It will be observed from the foregoing description of FIG. 10 that the operation of the motor is initiated in response to momentary closure of any key switch (FIGS. 6A, 6B, 6C), or more specifically in response to energization of any selector solenoid 211. The motor controls prevent a repeated ejection cycle if the operator should hold a key switch closed for a prolonged time. The arrangement of FIG. 10 also provides for the deenergization of the solenoids 211 shortly after the ejection cycle has begun even though the operator might hold the key switch closed for a considerable period. As noted above, when a key switch is closed, the selected ones of the solenoids 211 and the relay R3 are energized to start the motor. At a first instant later in time, the raised selector members or pins 208 latch with their slides. At a second instant slightly later in time, the relay contacts R4c open to deenergize all of the solenoids 211 irrespective of whether any key switch is closed.

There are two advantages which flow from this arrangement. First, regardless of how long the operator might hold a selector key depressed, the solenoids 211 are energized for only a very short period of time, i.e., until the motor has started and the contacts R4c have opened. So long as the key switch is closed, current will flow through it and its associated diodes to the relay R3. But such current is very small in magnitude due to the resistance of the relay R3 and the resistor 246. Since the relatively heavy currents required to energize the selector solenoids S1—S8 never flow for more than very short time intervals, the duty cycle on the switch contacts and diodes in the keyboard control circuits (FIGS. 6A–6C) permits the solenoid exciting current to exceed the steady state rating of the diodes. Even if the operator should hold a key depressed, the only current which will continue to flow through the key switch contacts and the associated diodes is that which will flow through the relay R3 and the resistor 246 in series therewith. Because this current is relatively low, its flow for a considerable period of time will not overload or damage the key switch contacts and the associated diodes even though the latter may have a limited steady current-carrying capacity.

A second advantage results from this shortened period of solenoid energization. If the selector solenoid exciting current were permitted to flow for prolonged periods when an operator holds a key switch closed (as is the case in the arrangement of FIG. 7), the armatures 212 (FIG. 8) might be held against the solenoid cores for considerable periods. With the vibrations, although slight, of the mechanism, there is some possibility, albeit very slight, that the armatures 212 might become permanently magnetized. If this should occur, the armature 212 might remain picked up and might even keep the associated pin 208 raised against the bias of its spring 210 after the solenoid has been deenergized and the pin moved free of the associated latch member 218. Any pin 208 which fails to restore to its normal position at the end of one ejection cycle will eject coins from its magazine on the next cycle even though its associated selector solenoid has not been energized. This possible malfunction is avoided by the controls of FIG. 10 since the selector solenoids can never be energized except for short periods of time, and thus there is no possibility that the solenoid armatures might become permanently magnetized to an extent which would produce improper operation.

If, following one coin ejection cycle, one of the feelers 228 (FIG. 8) should swing all the way into its associated coin magazine thereby detecting that the coins have been depleted from that magazine, the empty switch 234 (FIGS. 8 and 10) will be momentarily actuated. With this, an empty relay R5 will be energized, closing its contacts R5b which create a sealing path in parallel with the empty switch 234. The empty pilot light P on the keyboard (FIG. 1) will thus be energized through the contacts R5b to signal to the operator that one of the coin magazines is empty. Moreover, energization of the relay R5 will open the contacts R5a, thereby interrupting the energization circuit for the relay R3. With this, actuation of any of the selector switches cannot energize the relay R3, and thus the motor 220 cannot be started. The entire coin-dispensing machine is disabled whenever any one of the magazines becomes depleted.

If the operator should desire to operate the machine even though one magazine is empty (for example, in order to empty completely a magazine tray), he need only depress a by-pass switch BP which shunts the relay coil R5 and thereby drops out that relay. A resistor 247 limits current flow and prevents a dead short across the lines L5, L6 when the by-pass switch BP is closed. With drop-out of relay R5, the contacts R5a reclose and the machine can be put through another ejecting cycle of operation.

The present controls avoid improper operation or overloading of components if an operator should hold a key switch closed for a long period. There is, in addition, a problem of improper operation if an operator should happen to just "tickle" a key and close a key switch for a very short time. The selected ones of the solenoids 211 would be energized, their armatures 212 lifted, and the relay R3 picked up to start the motor 220. However, if the key switch is re-opened quickly, the solenoids 211 may be deenergized before the carriage 215 has advanced sufficiently to engage the raised pins 208 with the associated latch members 218. Thus, the machine would go through an ejection cycle, but some of the selected pins 208 would fail to cause ejection of coins from their magazines, resulting in an improper total change value being delivered to the cup.

In order to overcome this difficulty, provision is made to "lock up" each selector armature 212 and pin 208, so that they remain in their second or operative position from the instant that they are moved to such position until some time after the instant that the carriage 215 has advanced far enough to cause the raised pins 208 to engage the associated latch members 218. More specifically, provision is made to bias the selector armatures 212 toward their uppermost or second positions, this biasing force being sufficient to hold them in their upper positions but insufficient to move them from their lower to their upper positions.

In the exemplary arrangement of FIG. 10, a plurality of relatively high resistance resistors 248 are connected from the line L5 to respective ones of the solenoids 211, thereby supplying a "trickle" current through each of the solenoids 211 so long as the relay contacts R4c are closed. Such current creates a magnetic field exerting an upward biasing force on the arms 212 (FIG. 8), this force being insufficient to lift the arms 212 but being sufficient to hold them in their elevated positions once they have been lifted due to higher excitation current from the keyboard circuitry. With this magnetic bias, therefore, whenever any selector key of the keyboard is only "tickled," a very short surge of current flow from the keyboard circuits through the desired combination of the solenoids 211 will thus momentarily lift the corresponding armature 212 and pins 208. They cannot drop back down before a later, first instant when the carriage 215 has been advanced sufficiently to engage the lifted pins 208 with their latch members 218 on the associated slides 204. Rather, once any arm 212 has been even momentarily raised, it will be held in its uppermost position by the biasing force created from the trickle current flowing through the resistors 248. Thus, as the carriage 215 moves forwardly, all of the pins 208 which correspond to solenoids 211 energized but for an instant will be in their raised positions to engage the corresponding latch members 218 on the coin-ejecting slides 204. The coins totaling the change value assigned to the particular selector key switch which was actuated will thus be ejected.

Provision is made, however, to remove the biasing or holding force on the armatures 212 at a second instant which occurs some time after the first instant when the raised pins 208 engage latch members 218. It will be seen from FIG. 10 that whenever the relay R4 is energized during each ejection cycle and the contacts R4c opened, the trickle current through the resistors 248 and the solenoids 211 is interrupted. Thus, the selector armatures 212 are all returned to their original positions at a time instant somewhat after the raised pins 208 have engaged their associated latch members 218.

The control apparatus shown in FIG. 11 is in general similar to that of FIG. 10, and the same reference characters will be employed to identify like parts. FIG. 11 differs from FIG. 10 only in showing an alternative arrangement for producing and interrupting an "antitickle" holding force on raised selector members.

FIG. 12 shows in cross section a selector solenoid 211A which not only has the usual core 260 and armature 212, but which has two windings or coils 211c and 211b. As an alternative to the single coil solenoids 211 shown in FIGS. 8 and 10, the double coil solenoids 211A may be employed and connected electrically as illustrated in FIG. 11.

In FIG. 11, the eight selector solenoids 211A for a coin dispensing magazine have two sets of coils 211b and 211c. The first set of coils 211b are the selective pick-up coils and are connected to the keyboard switches and matrix in the same manner as the solenoids 211 in FIG. 10. The second set of coils 211c are the holding coils. They are each connected from the line L5 through the relay contacts R4c to the line L6. Each of these holding coils has relatively high resistance, and current normally flows therethrough to create a magnetic biasing force on the solenoid armatures. This biasing force is insufficient to pick up the associated armature 212, but sufficient to hold it picked up.

The advantageous operation of the "biasing means" described in connected with FIG. 10 is also obtained by the control arrangement of FIG. 11. If a key switch is only "tickled," any solenoid armature and selector member which is shifted to its operative or coin-ejecting position will be held there even though the key switch opens immediately and deenergizes the coils 211b. Thus, at a first instant after the key switch is closed and when the latch members 218 engage lifted pins 208 (FIG. 8), those pins which were lifted will still be held up. Then at a second, later instant in time, the relay R4 will open the contacts R4c, so that the biasing coils 211c (as well as the coils 211b) are deenergized to drop the armatures 212 back to their first positions. The raised pins 208 are restored by the springs 210 at the end of the ejection cycle when they move free of their latch members 218.

To be doubly certain that all lifted armatures 212 are returned to their first or lowermost positions, each such armature may be formed with a turned-up tip 212a which, if lifted, is disposed in the path of the lower end of the associated pin 208. With this arrangement, each pin 208 will cam the associated armature 212 downwardly to its first position if that armature should be raised when the carriage 215 completes its forward motion.

It will be understood from the foregoing description that the control system embodiment of FIGS. 7, 10 or 11 may be employed with either the mechanism of FIGS. 1–5 or the mechanism of FIGS. 8–9.

I claim:

1. In a coin dispensing mechanism having a plurality of coin-holding magazines, the combination comprising a plurality of selector members movable between operative and inoperative positions, a plurality of electric actuators for selectively moving said selector members to operative positions, means for shifting said selector members in unison to cause those which are operatively positioned to eject coins from the associated magazines, means electrically connected to and responsive to the energization of any one or combination of said actuators to initially energize said shifting means, means independent of said last-named means for holding said shifting means energized, means for disabling said holding means and for deenergizing said shifting means after one ejection cycle, and means to prevent a second energization of said shifting means unless all of said actuators are first deenergized after the completion of one ejection cycle.

2. In a coin dispensing mechanism having a plurality of coin-holding magazines, the combination comprising a plurality of selector fingers movable between effective and ineffective positions, a plurality of electric solenoids energizable in different combinations to selectively move said fingers to effective positions, a motor and means driven thereby to advance and retract said fingers in unison so that those in effective positions cause ejection of coins from the associated magazines, means electrically connected to said solenoids for starting said motor in response to energization of any one of said solenoids, means independent of said last-named means for holding said motor energized after initial energization, means for disabling said holding means and for stopping said motor after one ejection cycle, and means for rendering said starting means inoperative until all of said solenoids are first deenergized after said motor is stopped.

3. In a coin dispensing mechanism having a plurality of coin-holding magazines, the combination comprising a plurality of selector fingers movable between effective and ineffective positions, a plurality of electric solenoids associated with respective ones of said fingers, means including a plurality of switches for energizing said solenoids in different combinations to selectively move said fingers to effective positions, a rocker supporting said fingers, a motor and an eccentric for oscillating said rocker and causing those of said fingers in effective positions to eject coins from the corresponding magazines, a first relay having a coil in series with all of said solenoids and having contacts connected to start said motor when any one of said solenoids is energized, a cam driven by said motor, a switch controlled by said cam and connected to maintain said motor energized after it is started until said rocker is moved through one ejection cycle, and a second relay connected to be energized by said cam switch when said motor is started and to be sealed in by the contacts of said first relay, said second relay having normally closed contacts in series with the contacts of said first relay to prevent recycling of said motor after one ejection cycle unless all of said solenoids are first deenergized.

4. In a coin dispensing mechanism having a plurality of coin-holding magazines, the combination comprising a plurality of electrical actuators each corresponding to one of said magazines, power means for ejecting coins from those ones of said magazines which correspond to actuators which are energized when operation of such power means begins, a plurality of selector switches, means responsive to actuation of different ones of said switches for energizing different combinations of said actuators, means responsive to actuation of any of said selector switches for initiating operation of said power means, and means responsive to operation of said power means for deenergizing all of said actuators irrespective of the actuation of said switches.

5. In a coin dispensing mechanism having a plurality of coin-holding magazines, the combination comprising a plurality of selector members each corresponding to one of said magazines and movable between first and second positions, a plurality of electric actuators each operating when energized to shift a corresponding one of said members to its second position, a power-actuated means for ejecting coins from those magazines which correspond to those members which are in their second positions, means including selector switches for energizing said actuators in different combinations, means responsive to actuation of any one or combination of said selector switches for initiating operation of said power-actuated means, means for maintaining said power means in operation through one ejection cycle, and means responsive to initiation of operation of said power means for deenergizing all of said actuators even if one or more of said selector switches remains closed.

6. In a coin dispensing mechanism having a plurality of coin-holding magazines, the combination comprising a plurality of selector members each corresponding to one of said magazines and movable between first and second positions, a plurality of electric actuators each operating when energized to shift a corresponding one of said members to its second position, power actuated means for ejecting coins from those magazines which correspond to those members which are in their second positions, means including selector switches for energizing said actuators in different combinations, means responsive to actuation of any one or combination of said selector switches for initiating operation of said power-actuated means, means for maintaining said power means in operation through one ejection cycle, means responsive to initiation of operation of said power means for deenergizing all of said actuators even if one or more of said selector switches remains actuated, and means for preventing restarting of said power means so long as one of said selector switches is held actuated from the time that said power means completes its ejection cycle.

7. In a coin dispensing mechanism having a plurality of coin-holding magazines, the combination comprising a plurality of selector members each corresponding to one of said magazines and movable between first and second positions, a plurality of electric actuators each operating when energized to shift a corresponding one of said selector members to its second position, power means for ejecting coins from those of said magazines which correspond to the selector members which are shifted to their second positions, a plurality of selector switches, means for energizing said electric actuators in various combinations in response to actuation of various ones of said selector switches, starting means responsive to actuation of any one of said selector switches for initiating energization of said power means, means responsive to starting of said power means for keeping the same energized through one ejection cycle and then deenergizing such power means, means responsive to starting of said power means for preventing energization of any of said electric actuators, and means controlled by said starting means for preventing a second starting of said power means and a second energization of a combination of said electric actuators until any selector switch actuated at the instant said power means stops is released and one of the selector switches is subsequently actuated.

8. In a coin dispensing mechanism having a plurality of coin-holding magazines, the combination comprising a plurality of selector members selectively movable between first and second positions, a plurality of solenoids each operating when energized to shift a corresponding one of said selector members to its second position, an electric motor and means driven thereby for ejecting coins from those ones of said magazines which correspond to those of said selector members which are shifted to their second positions when said motor starts, a plurality of selector switches, means responsive to actuation of different ones of said switches for energizing different combinations of said solenoids, a first relay and means for energizing the same only whenever any one of said selector switches is actuated, normally open contacts controlled by said first relay, said normally open contacts being connected to start said motor when such contacts are closed, a cam switch controlled by said motor and connected to keep the latter energized, when once started, for one ejection cycle, a second relay and means for picking up the same whenever said motor is running, means for keeping said second relay picked up when the motor stops if said first relay is energized, means for preventing starting of said motor so long as said second relay is picked up, and means for preventing energization of any of said solenoids so long as said second relay is picked up.

9. In a coin dispensing mechanism having a plurality of coin-holding magazines, the combination comprising a plurality of selector members selectively movable between first and second positions, a plurality of solenoids each operating when energized to shift a corresponding one of said selector members to its second position, an electric motor, means cyclically driven by said motor for ejecting coins from those magazines which correspond to those of said selector members which are shifted to their second positions when said motor starts, a plurality of selector switches, means for energizing different combinations of said solenoids when different ones of said switches are actuated, a first relay having a coil, a plurality of diodes connected with like polarity to the coil of said first relay and comprising means to energize said first relay when any of said selector switches is actuated, a starting circuit for said motor including normally open contacts of said first relay, a running circuit for said motor including a cam switch closed when the motor starts and reopened when one ejection cycle is completed to stop the motor, a second relay, means for picking up said second relay whenever said motor starts, a seal-in circuit including contacts closed when said first relay is energized for holding said second relay picked up, first normally closed contacts of said second relay connected in said starting circuit, and second normally closed contacts of said second relay connected with said solenoid-energizing means to prevent operation of the latter whenever said second relay is picked up.

10. In a coin dispensing mechanism having a plurality of coin-holding magazines, the combination comprising a plurality of selector members movable between first and second positions, a plurality of electric actuators each associated with one of said members for moving it to its second position, selector switch means for energizing said actuators in different combinations, power means for ejecting coins from those magazines which correspond to those members which are shifted to their second positions, means exclusive of said selector switches for exerting a holding force to retain each of said selector members in its second position, and means for removing said holding force at a point in time later than the energization of said power means during each ejecting cycle.

11. In a coin dispensing mechanism having a plurality of coin-holding magazines, the combination comprising a plurality of selector members movable between first and second positions, each of said members being biased to its first position, a plurality of electric solenoids associated with respective ones of said selector members for selectively moving the latter to their second positions, a movable member and power means for moving such member through ejection cycles, means controlled by said selector members to eject coins from those magazines which correspond to those of said selector members which are in their second positions at a first instant after an ejection cycle of said movable member begins, means for energizing said solenoids in different combinations and simultaneously starting said power means, means independent of said last-named energizing means for creating a force biasing each of said selector members toward its second position, said biasing force being insufficient to shift said members to their second positions but sufficient to hold said members in their second positions, and means for removing said biasing force at a second instant in time after starting of said power means during each cycle.

12. In a coin dispensing mechanism having a plurality of coin-holding magazines, the combination comprising a plurality of selector members biased to first positions and movable to second positions, a plurality of electric solenoids each associated with one of said selector members, means for supplying a trickle current to all of said solenoids, said trickle current being insufficient to cause said solenoids to shift the corresponding members but sufficient to hold such members in their second positions, means for momentarily fully energizing different combinations of said solenoids to shift the corresponding selector members to their second positions, a movable member and power means for moving such member through ejection cycles, means controlled by said selector members for ejecting coins from those magazines which correspond to those of said selector members which are in their second positions at a first point in time after an ejection cycle of said movable member begins, means for starting said power means simultaneously with the full energization of any one of said solenoids, and means for terminating the trickle current to said solenoids at a second point in time after said power means are energized.

13. In a coin dispensing mechanism having a plurality of coin-holding magazines, the combination comprising a plurality of selector members biased to a first position and movable to a second position, a plurality of solenoids each corresponding to one of said selector members and operative when energized to shift that corresponding selector member to its second position, a plurality of holding coils each associated with one of said solenoids and operative when energized to hold the associated member in its second position, power means for ejecting coins from those ones of the magazines which correspond to those of said selector members which are in their second positions at a first point in time after an ejecting cycle begins, means for normally energizing all of said holding coils, selector switch means for momentarily energizing different combinations of said solenoids and simultaneously starting said power means, and means for deenergizing all of said holding coils at a second point in time after said power means are started.

14. In a coin dispensing apparatus having a plurality of coin-holding magazines, the combination comprising a plurality of selector members biased to a first position and movable to a second position, a plurality of electric actuators each operative when energized to shift a corresponding one of said members to its second position, power means for ejecting coins from those magazines corresponding to the particular ones of said members which are in their second positions at a first point in time after the beginning of an ejecting cycle, means for exerting a holding force on each of said members when it is in its second position, selector switch means for energizing different combinations of said actuators, means responsive to actuation of any of said selector switch means for starting said power means, means for removing said holding force and for deenergizing all of said actuators at a second point in time after said power means are started, means for keeping said power means operating, after starting, through one ejection cycle, and means for preventing restarting of said power means so long as any of said selector switch means is held actuated from the instant ending an ejection cycle of said power means.

References Cited in the file of this patent
UNITED STATES PATENTS 2,922,427    Buchholz et al.    Jan. 26, 1960
2,976,874    Buchholz    Mar. 28, 1961